Feb. 28, 1928.
L. D. SOUBIER
1,660,430
GLASS FEEDING APPARATUS
Filed March 3, 1924
3 Sheets-Sheet 1
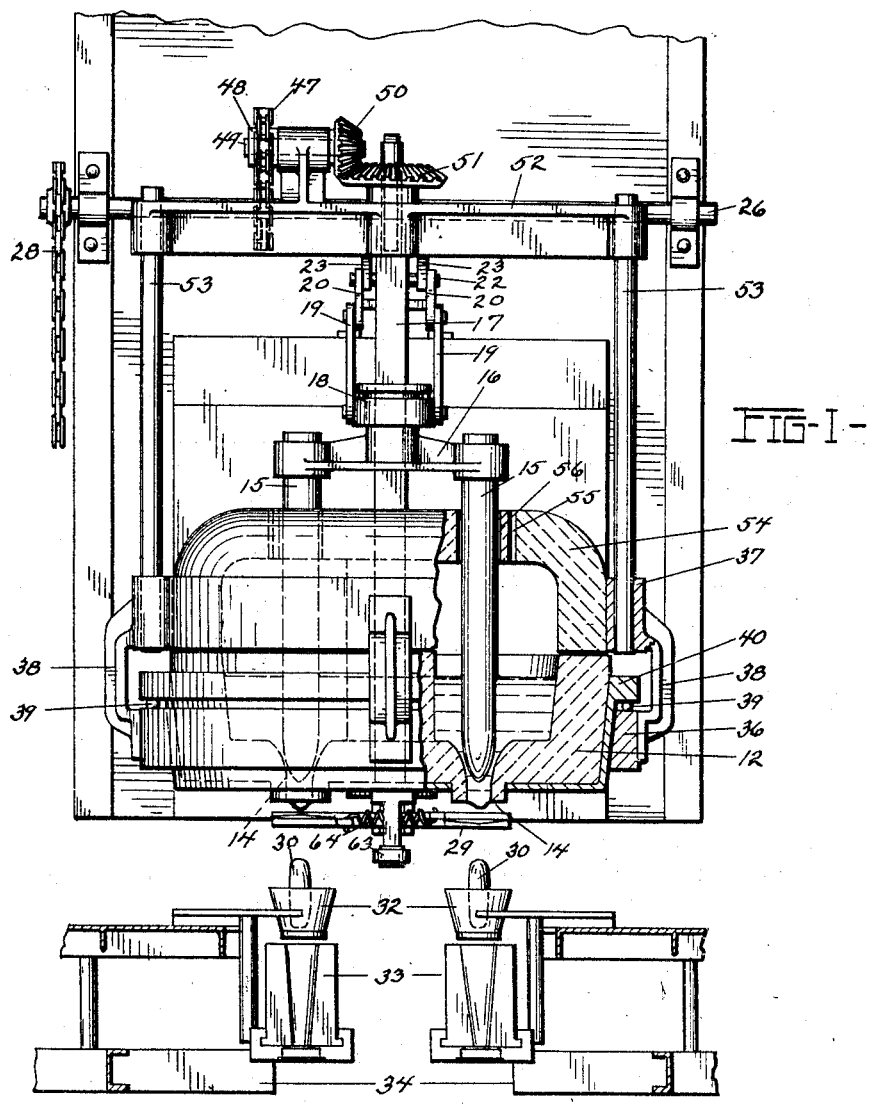
FIG-I-
INVENTOR
Leonard D. Soubier
BY J. F. Rule
HIS ATTORNEY.

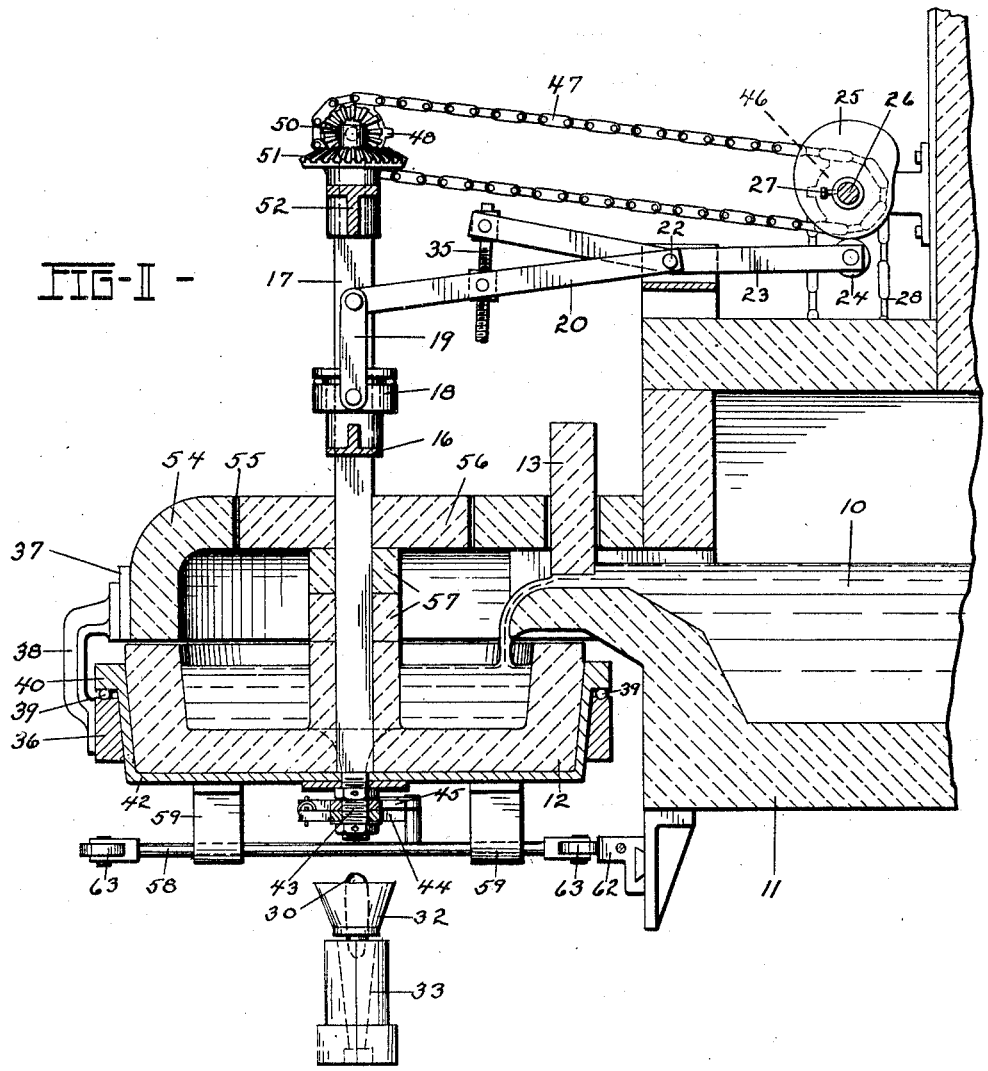

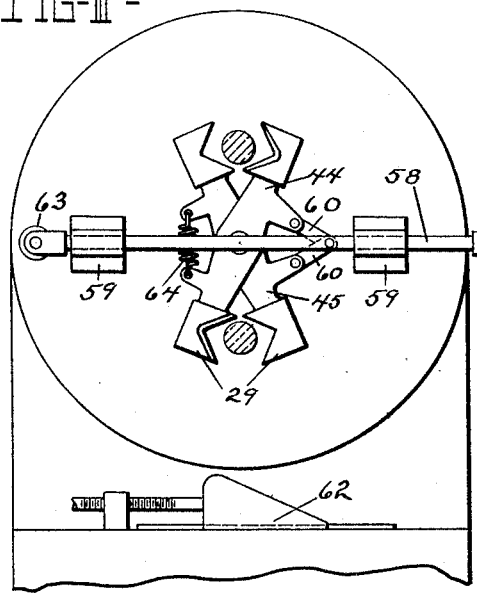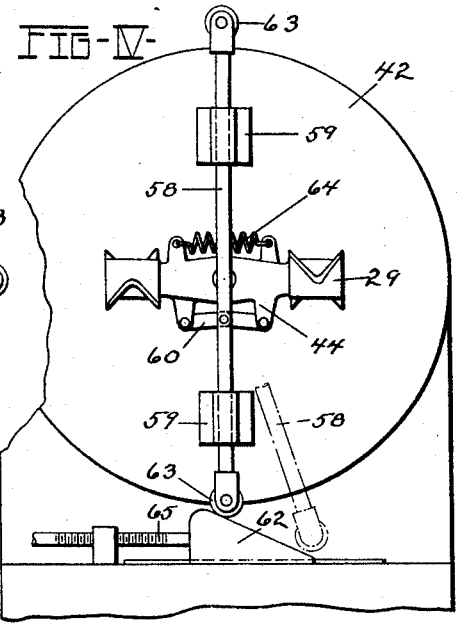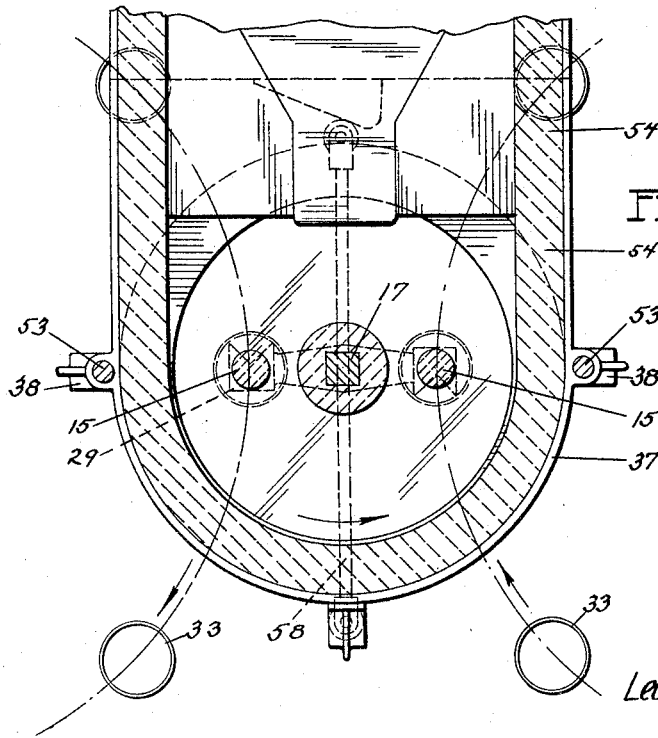

Patented Feb. 28, 1928.

1,660,430

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-FEEDING APPARATUS.

Application filed March 3, 1924. Serial No. 696,502.

My invention relates to glass feeders adapted to deliver individual masses of molten glass suitable for mold charges. More particularly, the invention relates to a feeder designed for delivering formed charges of glass simultaneously to the molds of two glass forming machines.

The apparatus in its preferred form comprises a charger or receptacle to which molten glass is continuously supplied from a melting tank or furnace, the charger having outlet openings in its bottom through which the glass issues. Regulating plugs reciprocating in the glass over the outlets control the discharge. Means are provided for rotating the said charger, together with the plugs, whereby the discharge outlets are caused to advance with the traveling molds and in register with the latter as the charges or gobs of glass drop into the molds.

Other features of the invention will appear hereinafter.

In the accompanying drawings, which illustrate an apparatus constructed in accordance with the principles of my invention:

Figure 1 is a front elevation of the apparatus, partly in section.

Figure 2 is a sectional side elevation of the same.

Figures 3 and 4 are bottom plan views with the parts in different positions.

Figure 5 is a sectional plan view.

The molten glass 10 is supplied from a furnace or refining tank 11 and flows into a charger or receptacle 12. The flow may be regulated and controlled by an adjustable gate 13. The pot 12 is provided with outlet openings 14 through which the charges of glass issue. These openings are preferably arranged diametrically opposite each other. The discharge of glass is controlled by a pair of regulating plugs or plungers 15 adapted to be periodically reciprocated vertically over the outlets. The plugs are carried by a yoke 16 slidable up and down on a vertical shaft 17 which is mounted centrally within the charger 12. A sleeve 18 mounted on the stem of the yoke 16, is connected through links 19 to the parallel arms 20 of a lever having a fulcrum pin 22. Said lever also includes parallel arms 23 carrying a cam roll 24, which runs on a cam 25, connected to a drive shaft 26 by a set screw 27. The cam is rotatively adjustable on its shaft. The drive shaft is connected through a sprocket wheel and chain 28 to any suitable source of power for continuously driving the shaft.

The rotation of the cam operates through the connections described to periodically reciprocate the regulating plugs 15 for exerting expelling and retarding forces on the issuing glass, and thereby producing formed charges or gobs of glass which are suspended from the walls of the outlets 14. The suspended glass is served by shears 29, as hereinafter described, permitting the gobs 30 to drop through funnel guides 32 into molds 33 mounted on the continuously rotating mold carriages 34 of the glass blowing machines. The cam operated lever 20, 23 may be provided with the usual adjusting rod 35 for adjusting the plugs 15 up or down to thereby regulate the size of the issuing gobs.

The charger 12 is mounted for continuous rotation on a supporting frame comprising an annular bearing member or ring 36 hung from a horizontal strap 37 by arms 38. Bearing balls 39 are interposed between the ring 36 and the bearing flange 40 formed on the metal frame in which the body of the charger 12 is mounted.

The shaft 17 is non-circular,—preferably square—in cross section, and is provided at its lower end with a screw threaded stem 43 extending downward through the frame 42. The cutter blades 29 are carried on a pair of levers or shear arms 44 and 45, pivoted on the stem 43.

The charger 12 is rotated, preferably continuously, about the axis of the shaft 17 by power transmitted from the drive shaft 26 through a train of gearing comprising a sprocket wheel 46, chain 47, sprocket wheel 48 and pinion 50 on a shaft 49, and gear 51 connected to rotate the shaft 17. The gear 51 has a bearing on a stationary yoke 52, carried on standards 53, rising from the frame member 37.

A cover for the charger comprises a stationary cover member 54 supported in the frame 37, said member having a circular opening 55 within which is a circular cover piece 56. The plugs 15, yoke 16 and cover piece 56 rotate with the charger during the downward movement of the plugs, and with the preferred construction, as shown, rotate continuously with the charger. The part 56 may be supported on blocks 57 which form a pillar rising from the floor of the charger. Said blocks also provide a protecting sleeve for the shaft 17 which may be made of metal. The charger 12, blocks 57, and cover portions 54 and 56, are all preferably made of fire clay.

The mechanism for actuating the shears comprises a rod 58, mounted for longitudinal reciprocating movement in brackets 59 attached to the frame 42. A pair of links 60 connect said rod with the cutter arms 44 and 45. The rod is periodically moved in the direction of its length by a cam 62 in the path of cam rolls 63 on the rod. As the charger rotates, the rod 58 is carried therewith from the Figure 3 position to the dotted line position, Figure 4. The roll 63 now engages the cam and imparts a longitudinal movement to the rod as the charger continues to rotate. This movement of the rod operates through the toggle links 60 to move the shear blades about their pivots to the Figure 4 position, thereby severing the suspended gobs. As the links 60 pass the straight line position (Fig. 4), a spring 64 operates to snap the shear blades to an open position. When the charger has made another half rotation, the roll on the opposite end of the rod 58 comes into engagement with the cam 62 and moves the rod lengthwise in the reverse direction, thereby again operating the shears to sever the next succeeding gob. It will be understood that the operation of the shears is synchronized with the movements of the regulating plugs, the gearing being so proportioned that the plugs make two complete reciprocations, namely, two up and down movements during each complete rotation of the charger. The cam 62 is mounted for lengthwise adjustment, said adjustment being effected by an adjusting screw 65, whereby the operation of the cutters may be accurately adjusted and timed with respect to the movements of the plungers 15.

The charger rotates in a counter-clockwise direction, as indicated in Figure 5 by an arrow. The molds 33 also travel in the directions indicated by the arrows (Fig. 5), so that the suspended gobs are moving in the same general direction with the molds at the time of severance, thereby assisting in guiding the severed gobs into the molds. The charger is geared to or driven in synchronism with the mold carriages so that a mold is presented beneath each gob at the time of severance.

Modifications may be resorted to within the spirit and scope of my invention.

What I claim is:

1. The combination of a container for molten glass, means to rotate the container unidirectionally, said container having an outlet opening at the bottom thereof at one side of its axis of rotation, and mechanical means extending into the glass and operating therein to periodically exert an expelling force on the glass at the outlet and thereby exude charges of glass through said opening.

2. The combination of a container for molten glass, means to rotate the container about a central vertical axis, said container having an outlet opening at the bottom thereof at one side of said axis, an implement within the glass in the container, and means for moving the implement periodically toward and from the outlet to control the discharge of glass through the outlet.

3. The combination of a container for molten glass, means to rotate the container about a central vertical axis, said container having an outlet opening at the bottom thereof at one side of said axis, and mechanical means in the glass within the container moved periodically toward and from the outlet and thereby exerting a periodic expelling force on the glass to control the discharge through said outlet.

4. A container for molten glass, means to rotate the container about a central vertical axis unidirectionally, said container having an outlet opening in its bottom at one side of said axis, a plunger periodically reciprocating vertically in the glass over the outlet, shearing mechanism carried by the container and rotatable therewith, and means to periodically actuate said shearing mechanism.

5. The combination of a container for molten glass, means to rotate the container unidirectionally about a vertical axis, said container having an outlet at one side of said axis through which the glass is discharged, an implement reciprocating vertically in the glass over the outlet to cause an accelerated and retarded movement of the glass through the outlet, means to separate the discharged glass into mold charges, and horizontally traveling molds brought periodically beneath said outlet to receive the charges and arranged to travel in register with the outlet while receiving said charges.

6. The combination of a container for molten glass, means to rotate the container unidirectionally about a vertical axis, said container having an outlet at one side of said axis, horizontally traveling molds brought periodically beneath the outlet and arranged to travel in register with the outlet, an implement reciprocating vertically in the glass over the outlet for controlling the discharge of glass and producing suspended gobs, and means for severing the gobs when the molds are in register with the outlet.

7. The combination of a container for molten glass, means for rotating the container about a vertical axis, said container having outlet openings in its bottom at opposite sides of said axis, means for periodically severing the issuing glass, and regulators operable in said outlet openings at predetermined times coacting with said severing means to shape the issuing glass.

8. The combination of a container for molten glass, means for rotating the container about a vertical axis, said container having outlet openings in its bottom at opposite sides of said axis through which the glass issues, regulators projecting into the glass over the outlets and periodically reciprocated vertically, means for periodically severing the issuing glass, said severing means comprising shear blades, arms carrying said blades, said arms connected to rotate with the receptacle, and means to periodically move said arms relatively to the receptacle to shear the issuing glass.

9. The combination of a container for molten glass, means for rotating the container about a vertical axis, said container having outlet openings in its bottom at opposite sides of said axis through which the glass issues, means for periodically severing the issuing glass, said severing means comprising shear blades, lever arms carrying said blades and fulcrumed to swing about said axis, said arms connected to rotate with the receptacle, an operating rod, links connecting said rod to the lever arms, said rod mounted to rotate with the receptacle, and a stationary cam arranged to periodically reciprocate said rod radially of said axis and thereby actuate the shears.

10. The combination of a container for molten glass, having an outlet opening in its bottom, means to rotate the container about a vertical axis, a cutter blade, a lever carrying said blade and mounted on the bottom of the container to rotate therewith, said lever fulcrumed to swing on said axis, an actuating rod also mounted on the bottom of the container to rotate therewith and operatively connected to said lever, and a stationary cam in the path of said rod operable to periodically move the rod relatively to the container and thereby actuate the cutter.

11. A glass feeder comprising, in combination, a container for molten glass, means for rotating the container about a vertical axis, said container having outlet openings in the bottom thereof at opposite sides of the axis, implements periodically reciprocating vertically in the glass over the outlet openings, shear blades, levers carrying said blades, said levers mounted on the receptacle for movement therewith and also for pivotal movement relative to the container about said axis of rotation, and means to periodically actuate said levers.

12. A glass feeder comprising, in combination, a container for molten glass, means for rotating the container about a vertical axis, said container having outlet openings in the bottom thereof at opposite sides of the axis, shear blades, levers carrying said blades, said levers mounted on the receptacle for movement therewith and also for pivotal movement relative to the container about said axis of rotation, means to periodically actuate said levers, said actuating means comprising a rod mounted on the container, toggle links connecting said rod with said levers, and a stationary cam in the path of the rod operable to periodically move said rod and thereby actuate the shears.

13. The combination of a container for molten glass, means to rotate it about a vertical axis, said container having outlet openings in its bottom at opposite sides of said axis, means reciprocating vertically in the glass over the outlet openings to accelerate and retard the discharge of said glass, traveling mold carriages, molds thereon, the movements of said container and molds being synchronized to bring the molds successively beneath the outlets and cause the molds to travel in register with the outlets, and automatic means associated with said container for serving the issuing glass and permitting it to drop into the molds.

14. The combination of a container for molten glass, means to rotate the container about a vertical axis comprising a central vertical shaft, means to rotate the shaft, regulating plugs projecting into the glass over the outlets, a yoke carrying said plugs, said yoke mounted on said central shaft, and means to periodically reciprocate said yoke on the shaft.

15. The combination of a container for molten glass, means for rotating the container about a vertical axis, said container having an outlet opening at one side of said axis, a regulating device, means for causing a periodic vertical movement of said device within the glass adjacent the outlet to control the issuing glass, and means to cause a rotative movement of said regulating device with the container about said axis.

16. The combination of a container for molten glass, means for rotating the container about a vertical axis, said container having an outlet opening at one side of said axis, a regulating device projecting into the glass over said outlet, means for periodically moving said device vertically toward and from the outlet, and means to cause a rotative movement of said device with the container about said axis during the movement of said device toward the outlet.

17. The combination of a container for molten glass having outlet openings in its bottom at opposite sides of its central vertical axis, means for rotating the receptacle about said axis, regulating plugs projecting downward into the glass over the outlets, means for periodically reciprocating said plugs vertically toward and from the outlets, and means for causing said plugs to advance with the container about said axis during their movement toward the outlets.

18. The combination of a container for molten glass having outlet openings in its bottom at opposite sides of its central vertical axis, means for rotating the receptacle about said axis, regulating plugs projecting downward into the glass over the outlets, means for periodically reciprocating said plugs vertically toward and from the outlets, and means forming a driving connection between the plugs and container for causing the plugs to rotate with the container.

Signed at Toledo, in the county of Lucas and State of Ohio, this 26th day of February, 1924.

LEONARD D. SOUBIER.